US007762566B2

(12) United States Patent  
Wang

(10) Patent No.: US 7,762,566 B2  
(45) Date of Patent: Jul. 27, 2010

(54) COMPUTER CART

(75) Inventor: Chia-Ming Wang, Shenkeng Township, Taipei County (TW)

(73) Assignee: Sallas Industrial Co., Ltd., Taipei County (TW)

( * ) Notice: Subject to any disclaimer, the term of this patent is extended or adjusted under 35 U.S.C. 154(b) by 158 days.

(21) Appl. No.: 11/826,219

(22) Filed: Jul. 13, 2007

(65) Prior Publication Data  
US 2009/0014972 A1 Jan. 15, 2009

(51) Int. Cl.  
*B62B 3/02* (2006.01)

(52) U.S. Cl. .................... 280/79.7; 280/651

(58) Field of Classification Search .............. 280/79.11, 280/79.7, 651; 248/346.07  
See application file for complete search history.

(56) References Cited

U.S. PATENT DOCUMENTS

| | | | | |
|---|---|---|---|---|
| 1,300,533 A * | 4/1919 | Wessinger | .................. | 248/129 |
| 4,166,638 A * | 9/1979 | De Prado | ................... | 280/638 |
| 4,796,909 A * | 1/1989 | Kirkendall | ................. | 280/651 |
| D302,891 S * | 8/1989 | Lardell | ........................ | D34/23 |
| 5,018,930 A * | 5/1991 | Hardin et al. | .............. | 414/458 |
| D330,135 S * | 10/1992 | Furner et al. | ................ | D6/513 |
| 5,249,823 A * | 10/1993 | McCoy et al. | .............. | 280/656 |
| 5,465,996 A * | 11/1995 | Wisz | ........................ | 280/651 |
| 5,779,252 A * | 7/1998 | Bolton, Jr. | ............ | 280/47.371 |
| 6,079,941 A * | 6/2000 | Lee | ............................ | 414/812 |
| 6,203,031 B1* | 3/2001 | Leverington | ............... | 280/35 |
| 6,371,497 B1* | 4/2002 | Scire | .......................... | 280/42 |
| 6,783,147 B1* | 8/2004 | Green, Sr. | .................. | 280/652 |
| 6,824,152 B1* | 11/2004 | Scott | ....................... | 280/79.7 |
| 7,324,334 B2* | 1/2008 | Sween et al. | ........... | 361/679.55 |
| 2004/0173996 A1* | 9/2004 | Anderson | .................. | 280/651 |
| 2007/0102893 A1* | 5/2007 | Mayo | ..................... | 280/79.11 |

* cited by examiner

*Primary Examiner*—Jeffrey J Restifo  
(74) *Attorney, Agent, or Firm*—Rosenberg, Klein & Lee

(57) ABSTRACT

A computer cart includes a chassis, which is formed of a first chassis member and a second chassis member that are coupled to each other and movable relative to each other to adjust the width of the chassis, a locking mechanism for locking the first chassis member and the second chassis member, a first retaining panel affixed to the first chassis member in vertical for supporting a computer on the chassis, and a second retaining panel affixed to the second chassis member in vertical for supporting a computer on the chassis.

7 Claims, 5 Drawing Sheets

US 7,762,566 B2

COMPUTER CART

BACKGROUND OF THE INVENTION

1. Field of the Invention

The present invention relates to a cart for carrying a computer and more particularly, to a compact computer cart that can easily be assembled without tools and that saves much storage space when not in use.

2. Description of the Related Art

Following fast development of computer manufacturing techniques in recent years, computer sales price has been greatly reduced as the computer usage rate keeps increasing. Regular computers include desktop computers and portable computers for different purposes. Portable computers have the characteristics of compact size and high mobility, however portable computers are not competitive in function and price when compared to desktop computers. Desktop computers have a relatively higher operating speed and better performance, however they commonly have a big size and are not convenient for movement. To solve the mobility problem, computer carts are created for carrying desktop computers individually.

FIG. 1 illustrates a conventional computer cart. According to this design, the computer cart 10 comprises a chassis 11, and two adjustable retaining panels 15 bilaterally provided at the top side of the chassis 11. The chassis 11 has two sliding slots 13 extending in transverse direction and arranged in parallel at two sides. The adjustable retaining panels 15 each have two mounting through holes 151 corresponding to the sliding slots 13. Mounting screws 131 are respectively inserted through the mounting through holes 151 of the adjustable retaining panels 15 and the sliding slots 13 and then respectively screwed up with a respective locknut 16 to lock the adjustable retaining panels 15 to the chassis 11.

The chassis 11 has two angled bottom flanges 112 disposed at two sides, and a plurality of mounting through holes 192 cut through the angled bottom flanges 112 for the mounting of respective castors 19. The castors 19 each have a top mounting screw rod 194 respectively inserted through the mounting through holes 192 of the angled bottom flanges 112 of the chassis 11 and screwed up with a respective locknut 18.

Referring to FIGS. 1 and 2, the locknuts 16 are loosened from the mounting screws 131, and then the two adjustable retaining panels 15 are moved with the mounting screws 131 along the sliding slots 13 apart from each other for allowing the computer 14 to be placed on the chassis 11 between the two adjustable retaining panels 15, and then the two adjustable retaining panels 15 are moved toward each other and closely attached to the two opposite lateral side panels of the computer 14, and then the locknuts 16 are fastened up with the mounting screws 131 to lock the adjustable retaining panels 15. Thus, the computer 14 is firmly secured to the computer cart 10. By means of the castors 19, the computer 14 and the computer cart 10 can conveniently be moved on the floor to the desired location. When assembling the computer cart 10, special hand tools such as wrench and screwdriver are necessary. Further, it is complicated to adjust the gap between the two adjustable retaining side plates 15 subject to the size of the computer 14 to be carried.

Further, the computer cart 10 (the chassis 11) has a width much greater than the widths of commercially available computers so that the computer cart can carry any of a variety of commercially available computers, i.e. the chassis 11 has a nonuse zone 111 after loading of the computer 14. This nonuse zone 111 brings inconvenience in use, and greatly increases the dimension of the computer cart 10, i.e., the computer cart 10 requires much storage space when not in use or during transportation.

SUMMARY OF THE INVENTION

The present invention has been accomplished under the circumstances in view. It is one object of the present invention to provide a computer cart, which uses thumbscrews and screw holes to have the chassis parts detachably and adjustably fastened together so that the installation of the chassis is easy without a tool.

It is another object of the present invention to provide a computer cart of which the chassis is formed of a first chassis member and a second chassis member. When not in use, the first chassis member and the second chassis member can be received together to reduce the size for shipment.

It is still another object of the present invention to provide a computer cart of which the first chassis member and second chassis member of the chassis are coupled to each other and movable relative to each other to adjust the size of the chassis for carrying any of a variety of computers having different sizes.

It is still another object of the present invention to provide a computer cart, which uses a thumbscrew for locking the first chassis member and second chassis member of the chassis so that the adjustment of the width of the chassis is easy and tool free.

To achieve these and other objects of the present invention, the computer cart comprises a chassis, the chassis comprising a first chassis member and a second chassis member, the first chassis member and the second chassis member being coupled to each other and movable relative to each other to adjust the width of the chassis; locking means adapted to lock the first chassis member and the second chassis member; a first retaining panel affixed to the first chassis member in vertical for supporting a computer on the chassis; and a second retaining panel affixed to the second chassis member in vertical for supporting a computer on the chassis.

DETAILED DESCRIPTION OF THE PREFERRED EMBODIMENT

Figure 1:
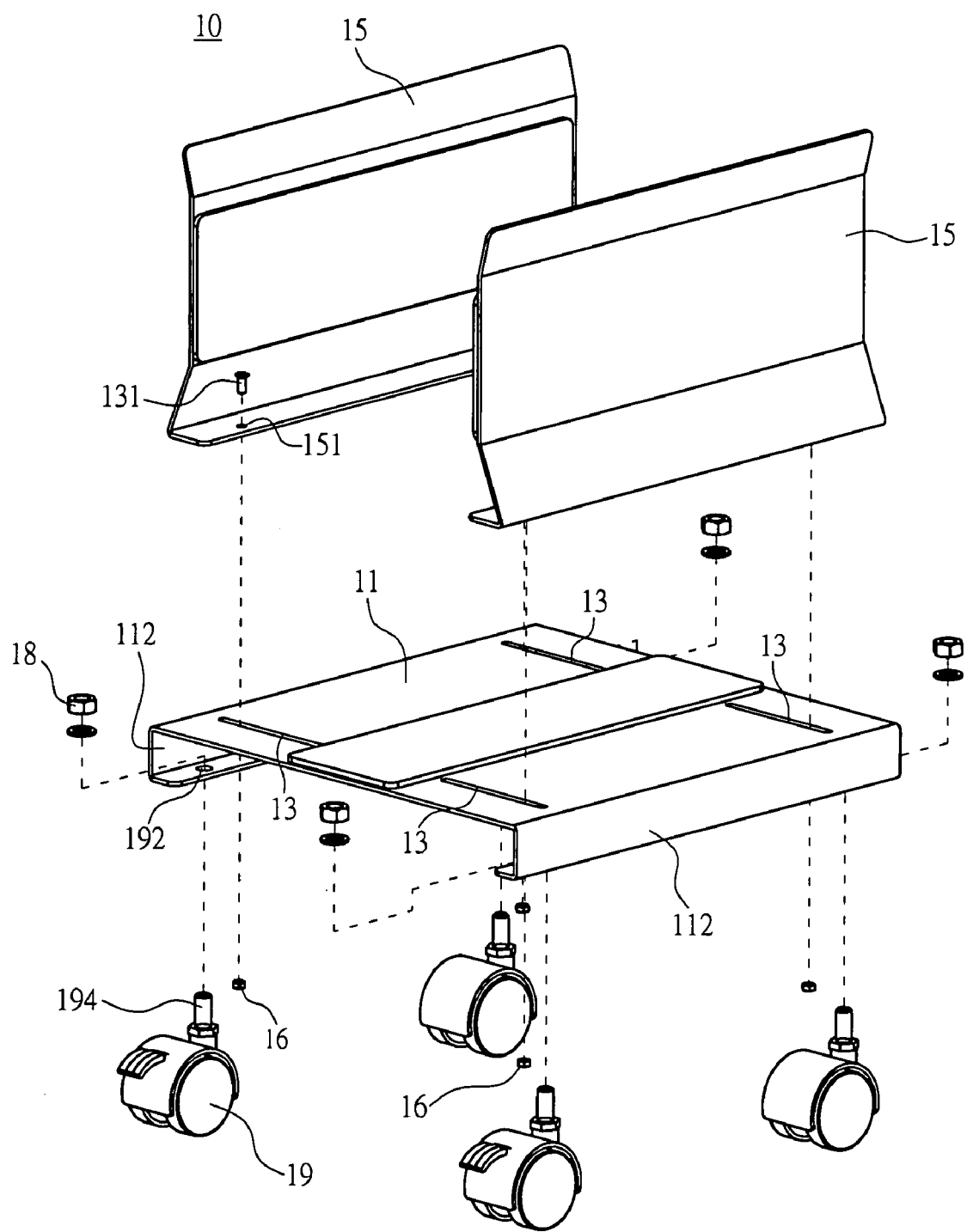
FIG. 1 is an exploded view of a computer cart according to the prior art.
Figure 2:
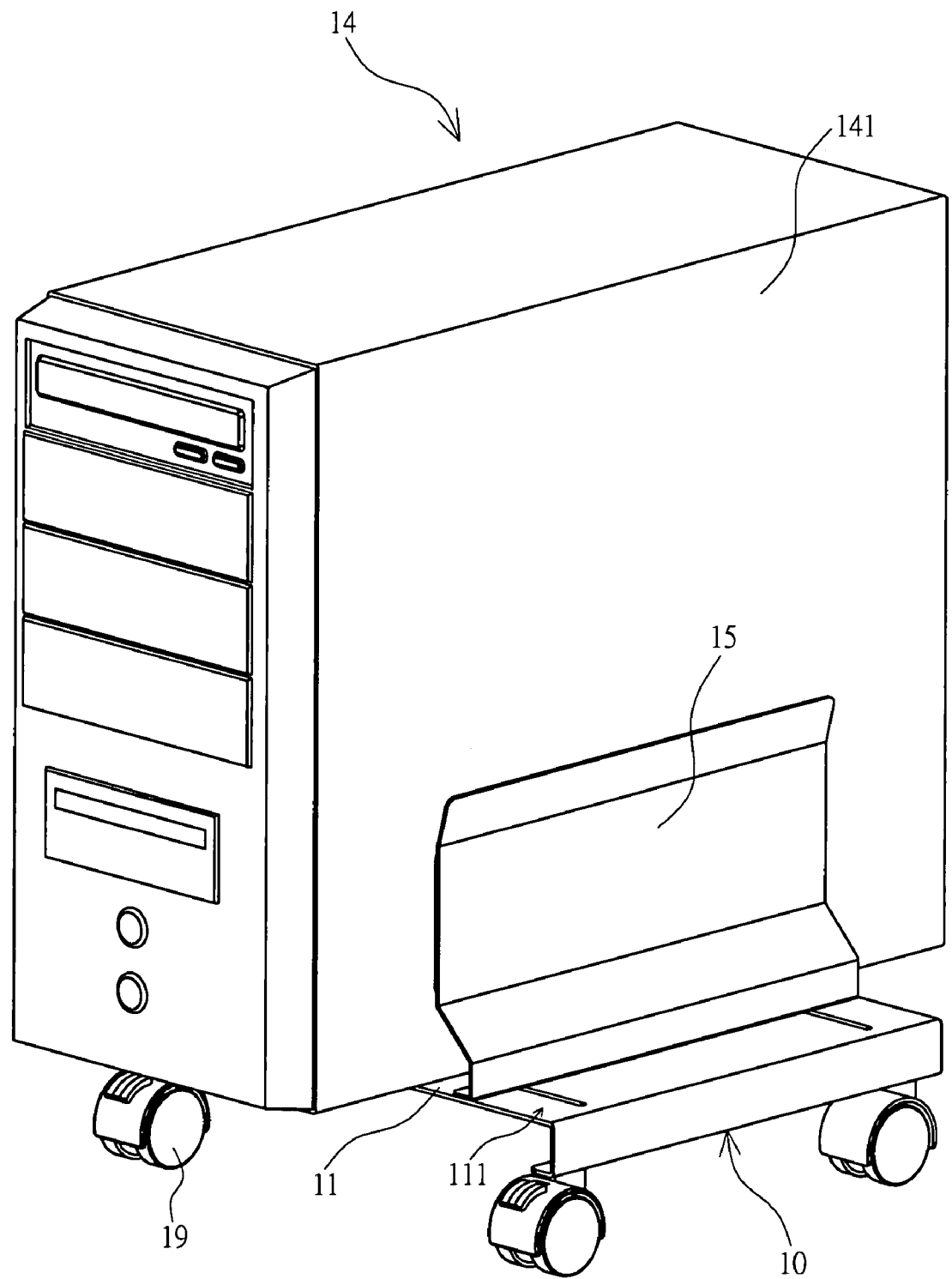
FIG. 2 is an elevational view showing an application example of the computer cart according to the prior art.
Figure 3:
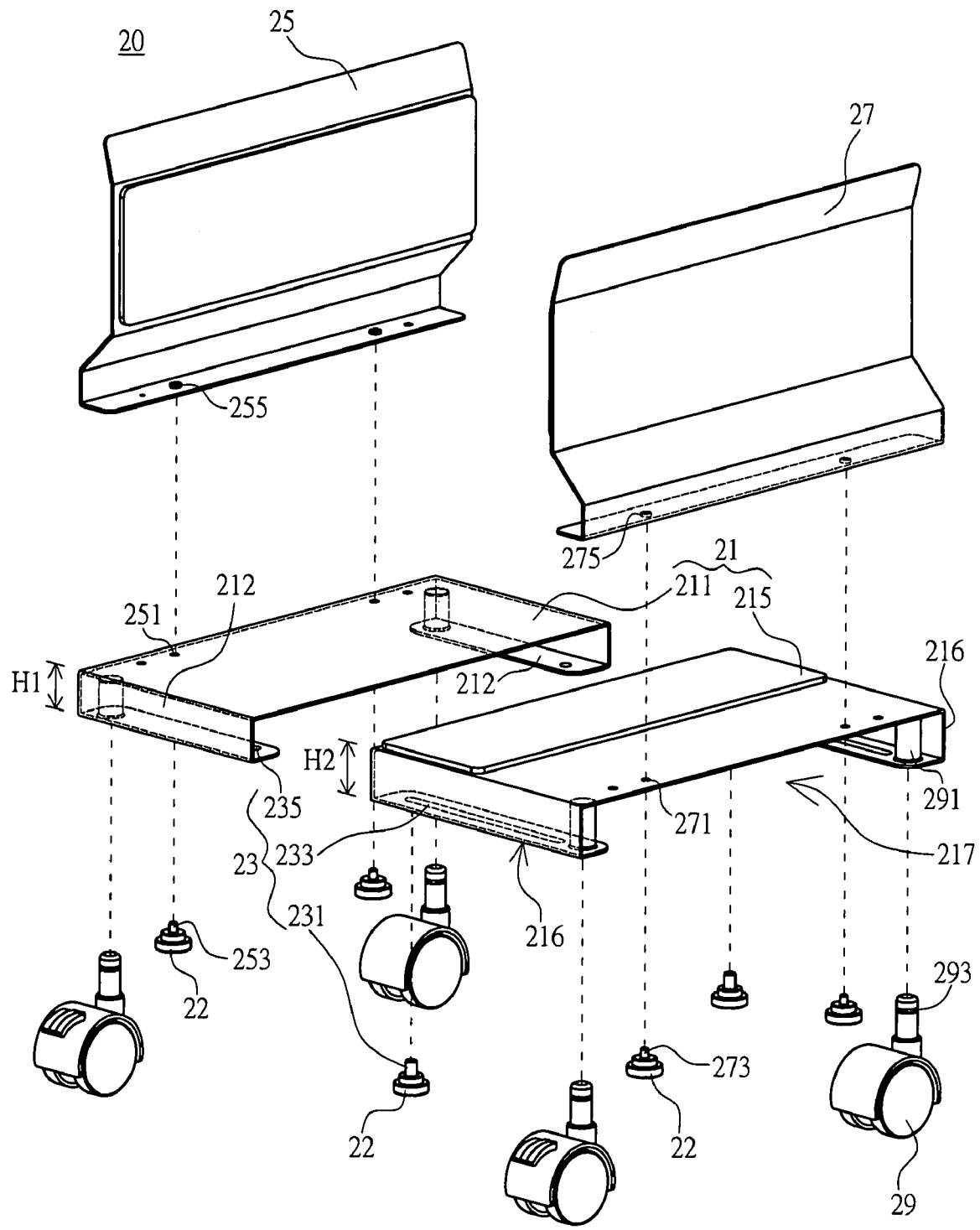
FIG. 3 is an exploded view of a computer cart according to the present invention.
Figure 4:
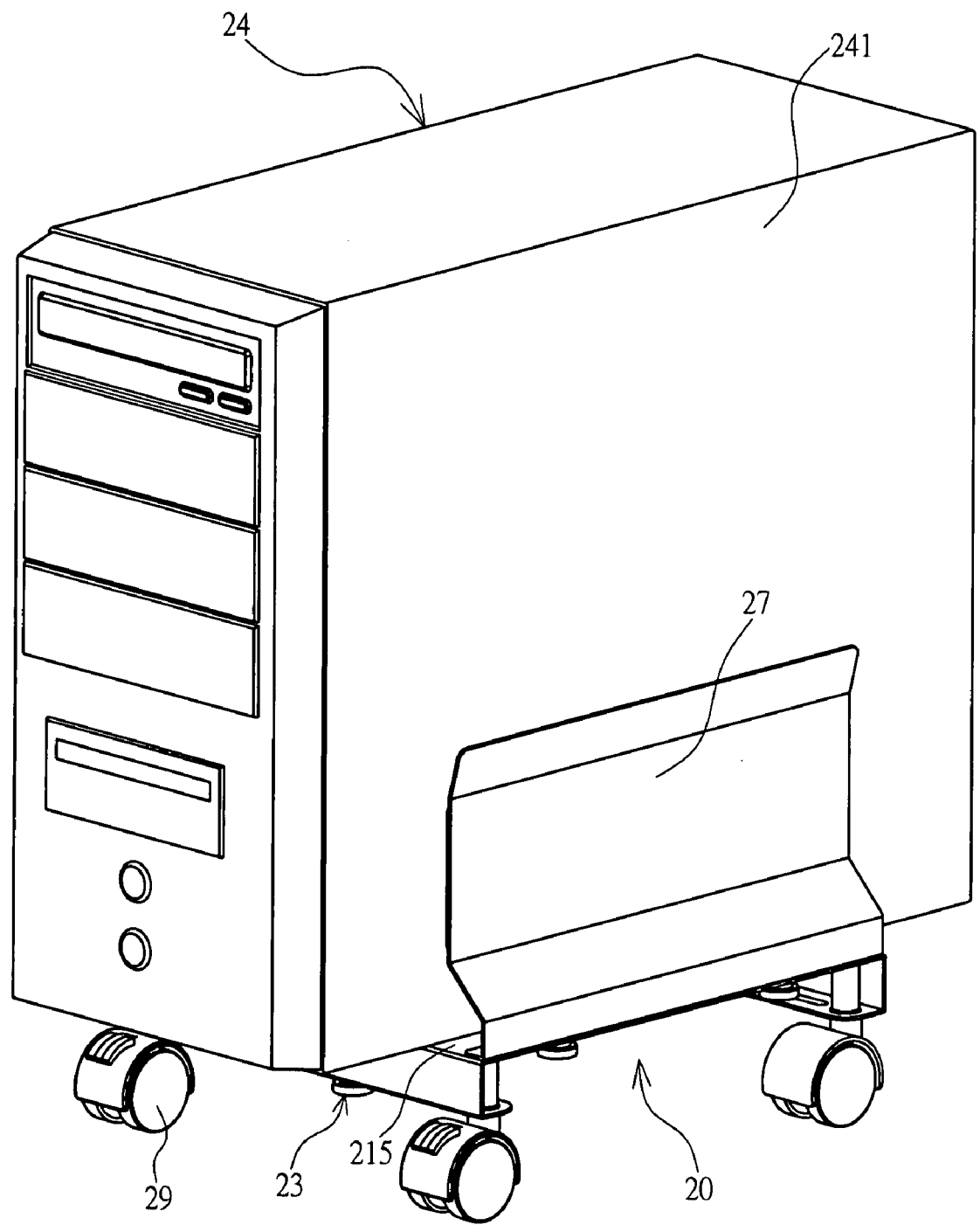
FIG. 4 is an elevational view showing an application example of the computer cart according to the present invention.

Referring to FIGS. 3 and 4, a computer cart 20 in accordance with the present invention is shown comprised of a chassis 21, a first retaining panel 25, and a second retaining panel 27. The chassis 21 is comprised of a first chassis member 211 and a second chassis member 215. The second chassis member 215 is coupled to the first chassis member 211 and movable relative to the first chassis member 211 to adjust the width of the chassis 21. As illustrated, the second chassis member 215 has a bottom sliding track 217, which receives the first chassis member 211 for allowing relative movement between the first chassis member 211 and the second chassis member 215.

A locking mechanism 23 is installed in the first chassis member 211 and the second chassis member 215 for locking the first chassis member 211 and the second chassis member 215. The first retaining panel 25 and the second retaining panel 27 are respectively affixed to the outer side of the top wall of the first chassis member 211 and the outer side of the top wall of the second chassis member 215 in vertical.

When a computer 24 is carried on the chassis 21, the locking mechanism 23 is unlocked, and then the first chassis member 211 is moved along the sliding track 217 relative to the second chassis member 215 to adjust the distance between the first retaining panel 25 and the second retaining panel 27, keeping the first retaining panel 25 and the second retaining panel 27 closely attached to the two opposite vertical side panels 241 of the computer 24, and then the locking mechanism 23 is fastened up to lock the e first chassis member 211 is moved along the sliding track 217. In other words, the width between the first retaining panel 25 and the second retaining panel 27 is adjustable subject to the size of the computer 24 to be carried.

The first chassis member 211 has a flange 212 at each of the front and rear sides. The second chassis member 215 has a flange 216 at each of the front and rear sides corresponding to the flanges 212 of the first chassis member 211. The flanges 212 and 216 are respectively provided with a respective axle housing 291 to hold a respective castor 29. By means of the castors 29, the computer cart 20 can be moved on the floor freely. According to this embodiment, the castors 29 are respectively inserted through the axle housings 291 and then pivotally secured thereto with a respective retainer ring 293. This design allows quick installation of the castors 29 in the flanges 212 and 216 without tools, such as spanner or screwdriver. As an alternate form of the present invention, the axle housings 291 may be directly formed integral with the first chassis member 211 and the second chassis member 215, i.e., the flanges 212 and 216 may be eliminated.

According to this embodiment, the first chassis member 211 has a plurality of mounting through holes 251 cut through the top and bottom sides and aligned in a long along the outer lateral side. The first retaining panel 25 has a plurality of bottom screw holes 255 corresponding to the mounting through holes 251 of the first chassis member 211. thumbscrews 253 are respectively inserted through the mounting through holes 251 of the first chassis member 211 and threaded into the associating screw holes 255 of the first retaining panel 25 to affix the first retaining panel 25 to the first chassis member 211. This mounting arrangement allows quick mounting and dismounting of the first retaining panel 25.

Similarly, the second chassis member 215 has a plurality of mounting through holes 271 cut through the top and bottom sides and aligned in a long along the outer lateral side. The second retaining panel 27 has a plurality of bottom screw holes 275 corresponding to the mounting through holes 271 of the second chassis member 215. thumbscrews 273 are respectively inserted through the mounting through holes 271 of the second chassis member 215 and threaded into the associating screw holes 275 of the second retaining panel 27 to affix the second retaining panel 27 to the second chassis member 215.

The thumbscrews 253 and 273 each have a knob 22 at one end. Through the knobs 22, the user can install the thumbscrews 253 and 273 conveniently by hand without tools. Further, because the first chassis member 211 and the second chassis member 215 are coupled to each other and slidable relative to each other to adjust the gap between the first retaining panel 25 and the second retaining panel 27, the invention eliminates the problem of nonuse zone at the chassis, thereby effectively reducing the size of the chassis 20 when carrying a computer.

Further, each flange 212 of the first chassis member 211 has a height H1. Each flange 216 of the second chassis member 215 has a height H2. The height H2 is greater than the height H1 so that the second chassis member 215 can be sleeved onto the first chassis member 211, allowing sliding movement of the first chassis member 211 along the sliding track 217 of the second chassis member 215. Further, when not in use, the chassis 21 can be received in a received status by moving the first chassis member 211 toward the inside of the sliding track 217. At this time, the size of the computer cart 20 is greatly reduced.

Figure 5:
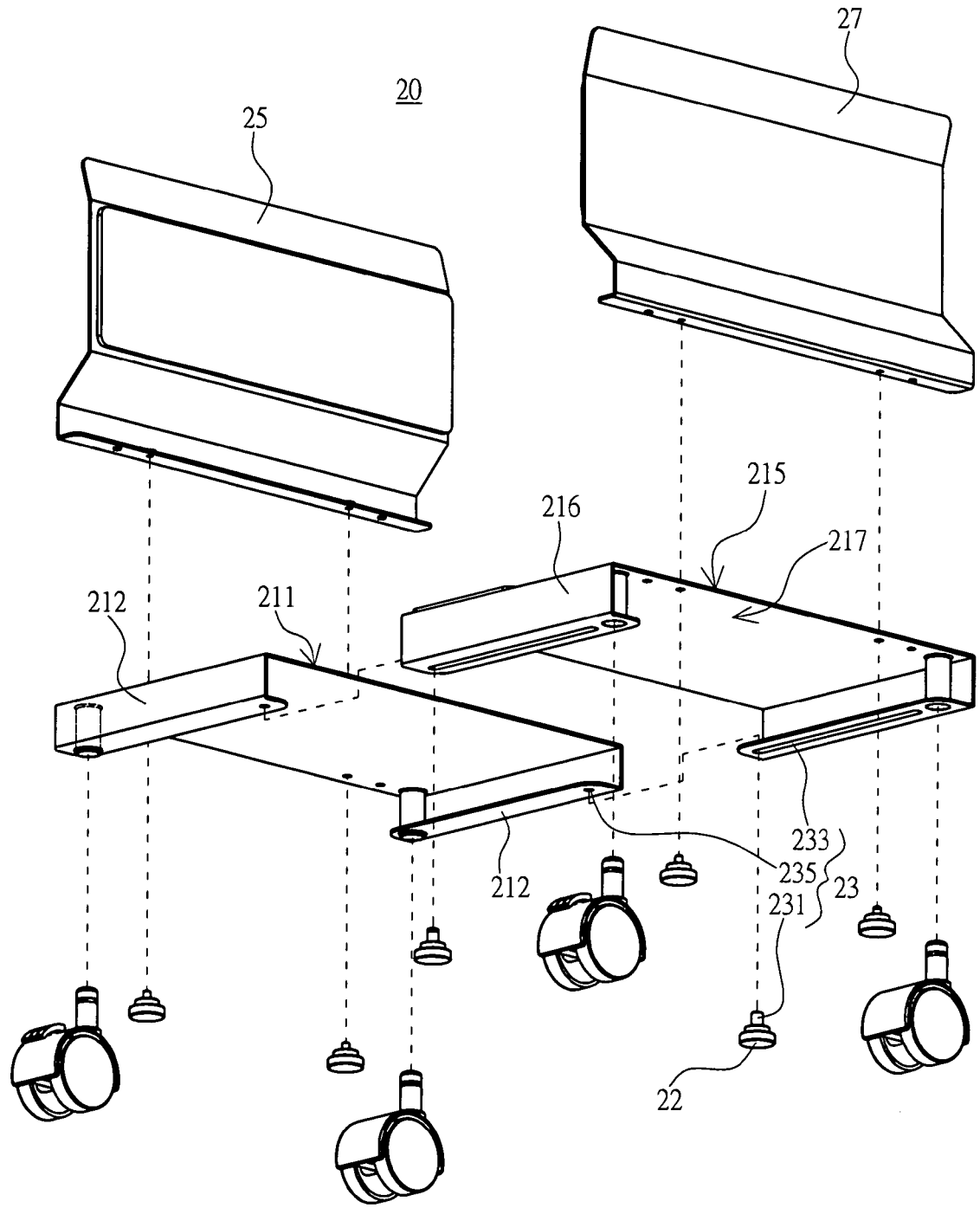
FIG. 5 is an exploded view of an alternate form of the present invention.

The detailed structure of the locking mechanism 23 and the operation of the computer cart 20 are outlined hereinafter with reference to FIGS. 4 and 5. The locking mechanism 23 comprises a sliding slot 233, a thumbscrew 231, and a locating screw hole 235. The sliding slot 233 is disposed at the second chassis member 215, for example, at the flange 216 at the front side of the second chassis member 215. The locating screw hole 235 is disposed at the first chassis member 211, for example, at the flange 212 at the front side of the first chassis member 211. The thumbscrew 231 is inserted through the sliding slot 233 and threaded into the locating screw hole 235 to lock the first chassis member 211 to the second chassis member 215.

When in use, loosen the thumbscrew 231, and then move the first chassis member 211 along the sliding track 217 relative to the second chassis member 215 to expand the gap between the first retaining panel 25 and the second retaining panel 27, and then place the computer 24 on the chassis 21, and then moving the first chassis member 211 along the sliding track 217 relative to the second chassis member 215 to attach the first retaining panel 25 and the second retaining panel 27 to the two opposite vertical side panels 241 of the computer 24, and then fastened tight the lock screw 231 to lock the first chassis member 211 and the second chassis member 215. Further, the thumbscrew 231 has a knob 22 at one end. Through the knobs 22, the user can fasten tight or loosen the thumbscrew 231 conveniently by hand without tools.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A computer cart comprising:
   a chassis, said chassis comprising a first planar sheet chassis member and a second planar sheet chassis member, said first planar sheet chassis member and said second planar sheet chassis member being coupled to each other and movable relative to each other to adjust the width of said chassis;
   locking means adapted to lock said first planar sheet chassis member and said second planar sheet chassis member;
   a first retaining panel affixed to said first planar sheet chassis member disposed vertically for supporting a computer on said chassis; and
   a second retaining panel affixed to said second planar sheet chassis member disposed vertically for supporting a computer on said chassis; said second retaining panel being thereby adjustably spaced from said first retaining panel by said chassis, said chassis defining a substantially planar surface spanning the adjustable space between said first and second retaining panels;

wherein said locking means comprises a sliding slot and a locating screw hole respectively disposed at said first planar sheet chassis member and said second planar sheet chassis member, and a thumbscrew inserted through said sliding slot and threaded into said locating screw hole to lock said first planar sheet chassis member to said second planar sheet chassis member;

wherein said first planar sheet chassis member and said second planar sheet chassis member each have a front side and a rear side, and a flange at each of said front side and said rear side;

wherein the thumbscrew of said locking means has a knob at one end thereof;

wherein said first retaining panel has a plurality of bottom mounting screw holes; said first planar sheet chassis member has a plurality of mounting through holes and a plurality of thumbscrews mounted in the mounting through holes of said first planar sheet chassis member for threading into the bottom mounting screw holes of said first retaining panel to lock said first retaining panel to said first planar sheet chassis member;

wherein said second retaining panel has a plurality of bottom mounting screw holes; said second planar sheet chassis member has a plurality of mounting through holes and a plurality of thumbscrews mounted in the mounting through holes of said second planar sheet chassis member for threading into the bottom mounting screw holes of said second retaining panel to lock said second retaining panel to said second planar sheet chassis member.

2. The computer cart as claimed in claim 1, wherein said second planar sheet chassis member comprises a sliding track adapted to receive said first planar sheet chassis member.

3. The computer cart as claimed in claim 1, wherein the sliding slot and locating screw hole of said locking means are respectively provided one flange of said first planar sheet chassis member and one flange of said second planar sheet chassis member, and the thumbscrew of said locking means is inserted through the sliding slot and threaded into the locating screw hole to lock said first planar sheet chassis member to said second planar sheet chassis member.

4. The computer cart as claimed in claim 1, wherein said first planar sheet chassis member and said second planar sheet chassis member each have a plurality of axle housings, and a plurality of castors respectively pivoted to said axle housings at a bottom side of said chassis.

5. The computer cart as claimed in claim 1, wherein the thumbscrews of said first planar sheet chassis member each have a knob at one end thereof.

6. The computer cart as claimed in claim 1, wherein the thumbscrews of said second planar sheet chassis member each have a knob at one end thereof.

7. The computer cart as claimed in claim 1, wherein said first planar sheet chassis member and said second planar sheet chassis member each have a plurality of axle housings respectively disposed at the respective flanges, and a plurality of castors respectively pivoted to said axle housings at a bottom side of said chassis.

* * * * *